March 27, 1934.　　　H. H. CHASSAGNE　　　1,952,421
VULCANIZING APPARATUS
Filed July 22, 1929

Inventor
Howard H. Chassagne

By

Attorney

Patented Mar. 27, 1934

1,952,421

UNITED STATES PATENT OFFICE 1,952,421

VULCANIZING APPARATUS

Howard H. Chassagne, Akron, Ohio, assignor to Wingfoot Corporation, Wilmington, Del., a corporation of Delaware Application July 22, 1929, Serial No. 380,118

10 Claims. (Cl. 18—17)

This invention relates to an apparatus for vulcanizing inner tubes for pneumatic tires and has particular relation to an apparatus of this character in which a timing mechanism is employed for controlling the flow of fluid under pressure to and from an inner tube.

The object of the invention is to provide automatic means for preventing fluid discharged from an inner tube from passing through any of the valves of the timing mechanism thereby preventing the deposition of foreign matter in the fluid upon the valve seats and interfering with their operation.

One method of manufacturing inner tubes comprises forming the tube endless from raw or uncured rubber and subsequently vulcanizing it by subjecting its internal and external surfaces to pressure in the presence of heat. An ordinary apparatus for vulcanizing such tubes comprises a heater composed of two sections, one of which is stationary and the other of which is pivoted at one edge to the stationary section. Adjacent portions of the sections are provided with complementary cavities for receiving an inner tube. Fluid under pressure is admitted to the interior of the inner tube during its operation and is discharged therefrom at the termination of the vulcanizing operation by means of an automatic timing mechanism. While the operation of such a mechanism has proven very satisfactory, it was discovered that fluid discharging from the inner tube at the termination of the curing operation contained a substance which resembled pitch or tar in gaseous form. As this gas was discharged through the timing mechanism, it condensed and much of it was deposited on the face of the discharge valve, thereby rendering such valve inefficient or inoperative. Owing to the fact that the timing mechanism was of complicated construction, the clogging of the valve necessitated not only cessation of operation of the heater, but also required considerable labor and time in order to place it in an operable condition.

According to this invention, it is proposed to employ an automatic valve between the inner tube and the timing mechanism which prevents discharge of fluid from the inner tube through the timing mechanism. This valve comprises essentially a cylindrical casing provided with port openings and a plunger disposed within the casing. The plunger is provided with means for permitting fluid to flow through it in one direction, but for preventing fluid from flowing through it in an opposite direction. When fluid is admitted into the inner tube by the timing mechanism, it not only flows through the plunger, but so moves it that the port openings are closed, thus preventing discharge of the fluid through the casing. At the termination of the vulcanizing operation and the opening of the discharge valve in the timing mechanism for permitting the discharge of fluid from the inner tube, the flow of fluid from the latter causes a reverse movement of the plunger which exposes the port openings in the casing to the interior thereof. This permits the fluid to discharge to the atmosphere, and hence, the deposition of any foreign matter in the fluid upon the valve in the timing mechanism is prevented.

For a better understanding of the invention, reference may now be had to the accompanying drawing, forming a part of the specification, in which.

Figure 1:
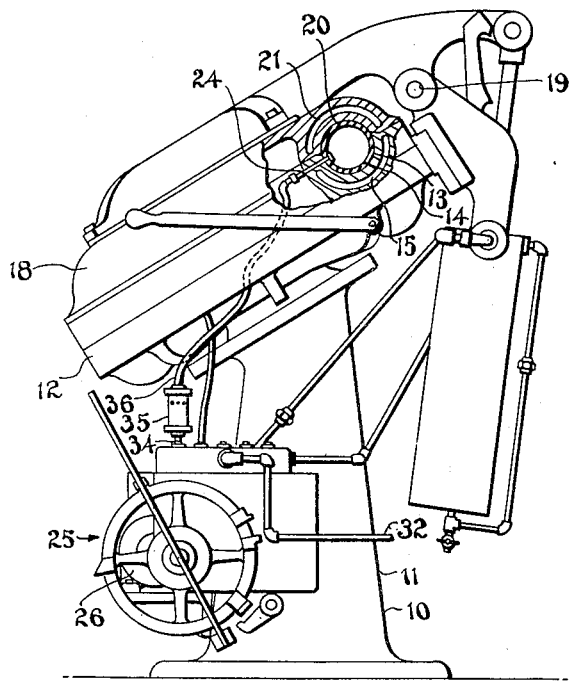
Figure 1 is an elevational view, partly cross-sectional, of an apparatus for vulcanizing inner tubes and having the invention embodied therein.

Referring to Figure 1, a heater 10 is illustrated, which is provided with a vertically disposed standard 11 having at its upper end a stationary heater section 12, disposed in a plane oblique with respect to the standard. This section is provided with a circular groove 13 adapted for receiving a part of an inner tube 14 and a chamber 15 for retaining a heating medium during the vulcanizing operation. A second mold section 18, complementary to the section 12, is pivoted thereto as indicated at 19. This section is provided with a circular groove 20 complementary to the groove 13 in the section 12, and a steam chamber 21, similar to the steam chamber 15. The inner tube 20 is provided with a conventional valve stem 24 which extends to an open portion centrally of the sections 12 and 18 comprising the heater.

A timing mechanism for controlling operation of the heater 10 is indicated generally at 25. Inasmuch as the particular construction of the timing mechanism is not a part of this invention, except as it enters into the general combination, it is believed unnecessary to describe it in detail. In general, it is provided with a motor 26, operatively connected to a shaft 27 (Figure 2), which is provided with cams 28 and 29 rigidly secured thereto. These cams are adapted to open respectively, normally closed valves 30 and 31 forming part of the mechanism. When the valve 31 is open, fluid is admitted through a conduit 32 into a chamber 33 within the casing of the timing mechanism, and in turn by means of a conduit 34 to a valve 35 which forms the principal subject matter of the invention. From this valve, the fluid is admitted into a conduit 36 which is connected to the valve stem 25 of the inner tube. When the valve 30 is open, fluid in the chamber 33 and conduit 34 is permitted to discharge therethrough into a chamber 41 in the casing of the timing mechanism, and from this chamber into a discharge conduit 42.

Figures 2, 3:
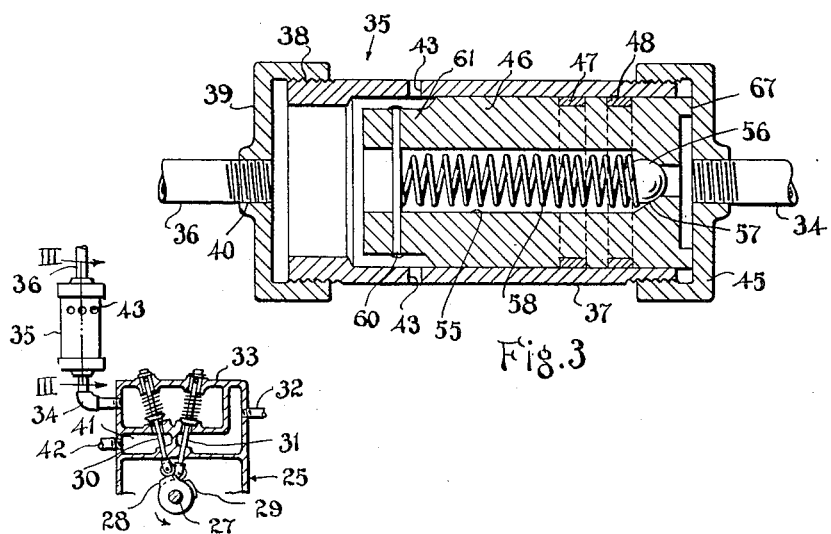
Figure 2 is a fragmentary cross-sectional view of a casing forming part of an automatic valve timing mechanism shown by Figure 1, also illustrating the invention.
Figure 3 is a cross-sectional view on a larger scale, taken substantially along the line III—III of Figure 2.

As best shown by Figure 3, the valve 35 comprises a cylindrical casing 37 having a series of port openings 43 extending therethrough. At one end, the casing 37 is threaded as indicated at 38 for receiving a cap 39 which in turn is provided with a central screw threaded opening 40 for receiving an end of the conduit 36. The opposite end of the casing 37 similarly is provided with a cap 45 which is connected to the conduit 34.

A plunger 46 is slidably mounted within the casing and is provided with piston rings 47 and 48 which prevent the flow of fluid between the plunger and the casing 37. The plunger is provided with an opening 55 extending longitudinally through its center which is tapered at its end adjacent the cap 45 to provide a conical seat 56. This seat normally is engaged by a ball 57 disposed within the opening 55 and resiliently pressed thereagainst by one end of a spring 58 also disposed within the opening 55. The opposite end of the spring is retained within the opening by a pin 60 extending diametrically through a reduced portion 61 of the plunger. When the plunger is so disposed in the casing 37 that its end adjacent the cap 45 abuts the latter, the reduced portion 61 of the plunger is disposed adjacent the port openings 43, thereby opening these ports to the interior of the casing adjacent the cap 39. The end of the plunger adjacent the cap 45 is provided with a centrally located cylindrical recess 67 thereby providing a central space between the end of the plunger and the cap 45 even though outer radial portions of the end of the plunger engage such cap.

In operation of the above described mechanism, when the cam 28 on the shaft 27 is free from engagement with the valve 30, this valve is closed and the cam 29 has opened the valve 31, thereby admitting fluid through the conduit 32 and into the conduit 34 and recess 67. This operation causes a movement of the plunger 46 to the end of the casing adjacent the cap 39, thereby closing the port openings 43 to the interior of the casing 37. The fluid also causes an unseating of the ball 57 from the seat 56, thereby permitting fluid to flow through the plunger and into the conduit 36 from which it flows into the inner tube 20. When a sufficient supply of fluid has been admitted to the inner tube, the cam 29 is disengaged from the valve 31, thereby permitting it to close. At the termination of the vulcanizing operation, the cam 28 opens the valve 30 which permits fluid in the inner tube to discharge. This fluid, flowing through the conduit 36, is prevented from flowing into the conduit 34 by reason of the fact that the fluid firmly presses the ball 57 against the seat 56. However, the fluid moves the plunger 46 to the end of the casing adjacent the cap 45, thereby exposing the port openings 43 to the interior of the casing and permitting the fluid to discharge to the atmosphere. Thus, the fluid in the inner tube is prevented from discharging through the timing mechanism.

From the above description, it is apparent that the valve provided by this invention effectively prevents the flow of fluid in an inner tube from discharging through the valve timing mechanism at the termination of the curing operation, thereby preventing the deposition of foreign matter upon any of the valves of the latter. It is also apparent that by reason of its simple construction, this valve may be readily removed and cleaned without requiring much labor or time. As a result, the vulcanizing apparatus may be used more efficiently than the apparatus employed prior to this invention.

Although I have illustrated but the preferred form of the invention and have described that form in detail, it will be apparent to those skilled in the art that the invention is not so limited, but that various modifications may be made therein without departing from the spirit of the invention or from the scope of the appended claims.

What I claim is:

1. In combination, a vulcanizer for curing hollow rubber articles inflated during the curing operation, a conduit connected to the article for admitting fluid under pressure thereto at the beginning of the curing operation, and for discharging the fluid therefrom at the termination of the curing operation, an automatic valve mechanism connected to the conduit for controlling the admission of fluid under pressure to the conduit and the discharge of the fluid therefrom, at the beginning and at the termination of the curing operation respectively, and an automatic valve in the conduit for discharging the fluid therefrom.

2. In combination, a vulcanizer for curing hollow rubber articles inflated during the curing operation, a conduit connected to the article for admitting fluid under pressure thereto at the beginning of the curing operation and for discharging the fluid therefrom at the termination of the curing operation, an automatic valve mechanism connected to the conduit for controlling the admission of fluid under pressure to the conduit and the discharge of the fluid therefrom at the beginning and at the termination of the curing operation respectively, and an automatic valve in the conduit for discharging the fluid therefrom, said valve including a casing having ports open to the atmosphere, and a plunger in the casing operated by the flow of fluid in the valve to open or close the ports to the interior of the valve.

3. In combination, a vulcanizer for curing hollow rubber articles inflated during the curing operation, an automatic valve mechanism for controlling the admission of fluid under pressure to the article at the beginning of the curing operation and discharging the fluid therefrom at the termination of the curing operation, and automatically operated means for preventing the fluid discharged from the article from passing through the valve mechanism.

4. In combination, a vulcanizer for curing hollow rubber articles, automatic means for controlling the admission of fluid under pressure to the article and the discharge of the fluid therefrom, a conduit connecting the means and the article, and automatic means in the conduit for conducting fluid from the first mentioned means to the article, but discharging the fluid from the conduit before it reaches the first mentioned means.

5. In combination, a vulcanizer for curing hollow rubber articles, a valve mechanism for controlling the admission of fluid under pressure to the article and the discharge of the fluid therefrom, a conduit connecting the means and article, and automatic means for conducting the fluid through the valve mechanism to the article, but preventing the fluid in the article from discharging through the valve mechanism.

6. In combination, a vulcanizer for curing a hollow rubber article, a valve mechanism connected to a source of fluid under pressure, a conduit connected to the valve mechanism and adapted for connection with the hollow article, and automatic means in the conduit for discharging the fluid from the article without passing through the valve mechanism.

7. In a vulcanizer, in combination, means for enclosing material to be vulcanized, means for supplying fluid pressure to the material, timing mechanism through which said fluid passes to the material, and means arranged between said timing mechanism and the material to prevent the return of said fluid through said timing mechanism.

8. In a vulcanizer, in combination, means for enclosing material to be vulcanized, means for supplying fluid pressure to the material, timing mechanism through which said fluid passes to the material, and a valve arranged between said timing mechanism and the material having means therein for allowing the fluid to flow to the material and to discharge the fluid upon its return from the material before the fluid enters the timing mechanism.

9. In a vulcanizer, in combination, means for enclosing material to be vulcanized, timing mechanism cooperating with said means, a conduit for fluid under pressure arranged between said material and said timing mechanism, and a valve arranged in said conduit to allow the fluid to flow through said timing mechanism only in the direction toward the means for enclosing material to be vulcanized.

10. In a vulcanizer, in combination, means for enclosing material to be vulcanized, timing mechanism cooperating with said means, a conduit for fluid under pressure arranged between said material and said timing mechanism, and a valve arranged in said conduit having means therein for allowing the fluid to flow to the material and to discharge the fluid upon its return from the material before the fluid enters the timing mechanism.

HOWARD H. CHASSAGNE.